United States Patent Office 3,223,604
Patented Dec. 14, 1965

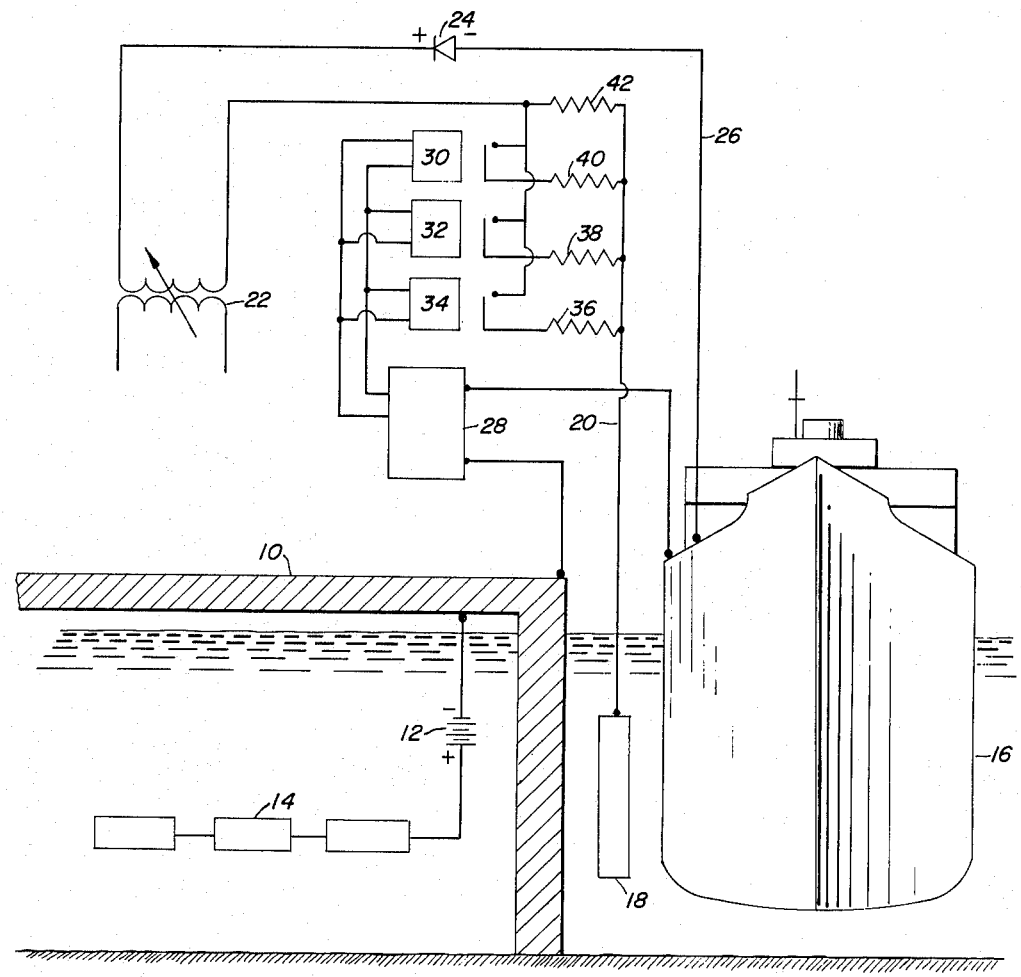

3,223,604
METHOD AND APPARATUS FOR ELIMINATING SPARK HAZARDS
Glenn A. Marsh, Crystal Lake, and Alfred E. Wolter, Arlington Heights, Ill., assignors, by mesne assignments, to Union Oil Company of California, Los Angeles, Calif., a corporation of California
Filed May 25, 1962, Ser. No. 197,746
4 Claims. (Cl. 204—147)

This invention relates to a method and apparatus for eliminating spark hazards between a ship and a steel dock which is under cathodic protection.

The application of cathodic protection to docks, wharfs, piers, and other partially submerged steel structures creates a potential spark hazard when a steel ship is tied up at the structure. The ship-to-water potential is usually at least 0.3 volt more positive than the dock-to-water potential, when the dock is being adequately protected. Under these conditions, the ship and dock act as the elcetrodes of an immense battery of 0.3 volt difference, with the water acting as the electrolyte.

Under these circumstances, any metallic contact between the ship and the dock will carry electric current from the dock to the ship. While the voltage is very low, the internal impedance of the ship-dock couple is also low and hence the magnitude of the current available at the point of contact (short circuit current) can be quite high, in the order of several hundred amperes. Thus, a spark may occur when contact is made, causing a serious explosion and fire hazard when flammable materials, such as gasoline, are being transferred at the dock. It has been established that visible sparks can be produced under high current conditions even when the potential difference between the contacting metal objects is as low as 0.1 volt. Where a short-circuit current of 100 amperes or more is available, visible sparks almost invariably occur where contact between metal objects takes place and the potential difference between the objects is above about 0.3 volt. At 0.14 volt, occasional small sparks will be observed. At 0.10 volt, about 1 spark will occur, on the average, per 20 contacts. At 0.05 volt potential, no sparks are visible.

It is known that a low-resistance bond between the ship and dock is capable of maintaining the ship-to-dock potential difference below 0.1 volt, but such a bond must have extremely low resistance. For example, where the current reserve is 100 amperes and a voltage difference of 0.05 volt is to be maintained, the resistance of the bond required to so limit the potential difference between the ship and dock could not exceed 0.0005 ohm. Such a low resistance is obtainable only by the use of large, heavy bonding cables. Extremely good contacts must be maintained to minimize contact resistance. Assuming zero contact resistance, which in fact is not achievable, a 100 ft. cable adapted to reduce the ship-to-dock potential to 0.05 volt at 100 amperes, if made of copper, would weigh over 600 lbs. Even a slight contact resistance would necessitate the use of a larger and heavier bonding cable. In practice, under prevailing ship and dock conditions, it is very difficult to achieve a total contact resistance low enough to adequately equalize the potential between the ship and the dock, irrespective of the cable size. Contact resistance is uncertain and empirical, and it is difficult to ascertain when an adequate bond has been provided. For this reason, the expedient of grounding the ship to the dock has proved to be a difficult means of achieving a low potential difference between the ship and the dock.

A low-resistance bond between ship and dock has another disadvantage, since the heavy currents which drain from the ship to the dock seriously unbalance the cathodic protection system used to protect the dock. This unbalance will usually produce inadequate protection of a portion of the dock, unless the total current applied to the cathodic protection system is far enough above that required to provide adequate protection under normal circumstances, so that even under the disrupting influences of the current flow from the ship, adequate protection is maintained. But to provide such over-protection is very costly.

It is therefore an object of this invention to provide an improved method and apparatus for equalizing the potential of a ship and a metallic, partially submerged marine structure.

In accordance with this invention, a method and apparatus has been devised for minimizing the spark hazard encountered when a ship is connected electrically to a cathodically protected dock. The invention makes possible elimination of spark hazard without the need for low-resistance contacts or large, heavy, bonding cables. In accordance with this invention, the spark hazard encountered when a ship is connected to a cathodically protected dock is minimized by applying to the side of the ship adjacent to the dock an auxiliary cathodic current emanating from an anode and powered by a variable-current output circuit, which in turn is controlled by a high-impedance voltage-sensing system, whereby the ship and dock potentials are brought to substantially the same value.

The invention is best described with reference to the drawing, wherein dock 10 is cathodically protected by means of direct-current source 12, and anode system 14. Because of the cathodic protection applied to the dock, ship 16 is at a potential about 0.3 volt more positive than the dock potential. In accordance with this invention, anode 18, which may in fact consist of several conventional anodic elements, is placed between dock 10 and ship 16, and is connected by cable 20 and power-regulating means to the secondary of variable transformer 22. The other terminal of the secondary of transformer 22 is connected through rectifier 24 to ship 16 by means of cable 26. No special precautions are needed to minimize the contact resistance, since ample potential is available to provide the necessary current to lower the potential of the ship to that of the dock. Potential-sensing amplifier 28 is connected between the ship and the dock. The amplifier 28, which may be mechanical or electrical, can be of the common kind adapted to linearly amplify potentials, in the range of about −0.1 volt to +0.1 volt to suitable positive output potentials. For example, the amplifier may be adapted to convert potentials in the range of −0.1 volt to +0.1 volt to positive voltages in the range of 10 to 30 volts. The output of the amplifier 28 is connected to relays 30, 32, and 34, which are adapted to cut out resistances 36, 38, and 40, leaving only resistance 42 in the power circuit. Thus, as the potential of the ship approaches that of the dock, resistances are cut out so that the current supplied by the anode 18 is decreased. It is evident that an equilibrium condition will come to exist at which the potential of the dock will equal that of the ship.

It will be appreciated by those skilled in the art that the specific circuit described is merely illustrative of one of many which may be employed. For example, a vacuum-tube potential-sensing unit may be used to control directly the output of the variable transformer 22, so that the current applied to the anode 18 is increased when the ship tends to become positive with respect to the dock, and is decreased as the potential of the ship is reduced to approximately that of the dock. The circuitry by which this can be achieved is well known and understood, and of itself forms no part of the instant invention. It will be evident to those skilled in the art that the desired result also can be achieved by the use of very sensitive relays, without preamplification. The feature of providing automatic means for adjusting the applied current to a value just sufficient to keep the potential of ship and dock equal is important. As the ship is unloaded, the wetted area becomes smaller and less current is required to maintain the desired potential. Also, the current initially required to achieve the desired potential will be greater than that later required, after the ship becomes polarized. The actual current densities will depend upon variable factors such as the condition of the paint covering the hull of the ship.

As a specific example of the invention, a cathodically protected dock has a potential of −0.85 volt vs. a copper-copper sulfate electrode. When a tank ship having a potential of −0.5 volt vs. a copper-copper sulfate electrode ties up at the dock, a spark hazard exists. An apparatus as aforedescribed is connected to ship and dock, and the ship's potential is immediately depressed to −0.82 volt, that is, within 0.03 volt of dock potential. After about an hour, the hull of the ship begins to polarize, causing the potential to slowly increase to a value of 0.87 volt, and upon the occurrence of further polarization, sensing unit 28 energizes a relay to decrease the current applied to the anode, thereby bringing the potential of the ship back to −0.84 volt. Also, as the ship loads or unloads, its wetted area changes, and sensing unit 28 makes compensating adjustments in the cathodic protection current applied to the ship, to maintain the desired potential.

Ordinarily, the current densities required will vary from about 2 milliamperes per square foot to about 14 milliamperes per square foot, depending principally upon the condition of the hull of the ship. The immersed area of a typical ship might be 30,000 sq. feet. It is necessary to apply current to only about 10,000 sq. ft., however, since it is only necessary to apply the cathodic current to the portions of the ship which are adjacent to the dock. For a current density of 5 milliamperes per square foot, this indicates that a current of about 50 amperes is required.

The embodiments of the invention in which an exclusive property or privilege is claimed are defined as follows:

1. An apparatus for reducing the potential between a ship and an adjacent, partially submerged, metallic structure comprising circuit means, including an anode submerged between said ship and said structure, for applying direct current to the side of said ship adjacent to said structure, means responsive to the potential difference between said ship and structure for controlling the magnitude of said applied current, said responsive means comprising parallel resistors, at least one of which being adapted to be cut out of said circuit to decrease said applied current when the ship is negative in potential with respect to said structure and being adapted to be cut into said circuit to increase the said applied current when the ship is positive in potential with respect to said structure, whereby said potential difference is maintained within the limits of 0.05 volt.

2. The method for reducing spark hazard between a ship and a submerged steel structure comprising supporting an anode below sea level between said ship and structure, passing a direct current from said anode to said ship to lower the potential of said ship through a circuit connecting said ship and said anode, measuring the potential of the ship with respect to the structure, and adjusting the magnitude of the direct current by parallel resistors at least one of which is cut out of said circuit to decrease said applied current when the ship is negative in potential with respect to said structure and is cut into said circuit to increase the said applied current when the ship is positive in potential with respect to said structure whereby the ship is maintained at about the same potential as said structure.

3. An apparatus in accordance with claim 1 in which said first-named means comprises a power circuit including a D.C. power source, an anode supported below sea level between said ship and said structure, a conductor connecting the negative of said source to said ship, and a conductor connecting the positive of said source to said anode.

4. The method in accordance with claim 2 in which the anode is positioned to apply current substantially only to the side of the ship adjacent to said structure.

References Cited by the Examiner
UNITED STATES PATENTS

| | | | |
|---|---|---|---|
| 2,021,519 | 11/1935 | Polin | 204—196 |
| 2,386,647 | 10/1945 | Andresen | 317—2 |
| 2,918,420 | 12/1959 | Sabins | 204—196 |

JOHN H. MACK, *Primary Examiner.*

JOHN R. SPECK, MURRAY TILLMAN, WINSTON A. DOUGLAS, *Examiners.*